United States Patent
Martínez Sanz et al.

(10) Patent No.: US 9,249,991 B2
(45) Date of Patent: Feb. 2, 2016

(54) INSULATING ELEMENT FOR EXPANSION COMPENSATION DEVICE AND METHOD FOR THE MANUFACTURE THEREOF

(75) Inventors: Noelia Martínez Sanz, Sevilla (ES); Javier Asensio Pérez Ullivarri, Sevilla (ES); Pablo José Bombin Ortega, Sevilla (ES); JoséÁngel Rico Sánchez, Sevilla (ES)

(73) Assignee: Abengoa Solar New Technologies, S.A., Sevilla (ES)

( * ) Notice: Subject to any disclaimer, the term of this patent is extended or adjusted under 35 U.S.C. 154(b) by 400 days.

(21) Appl. No.: 13/508,845

(22) PCT Filed: Nov. 11, 2010

(86) PCT No.: PCT/ES2010/000456
§ 371 (c)(1),
(2), (4) Date: Jul. 11, 2012

(87) PCT Pub. No.: WO2011/098623
PCT Pub. Date: Aug. 18, 2011

(65) Prior Publication Data
US 2012/0272950 A1   Nov. 1, 2012

(30) Foreign Application Priority Data
Nov. 12, 2009   (ES) .................. 200902158

(51) Int. Cl.
*F24J 2/51*   (2006.01)
*F24J 2/05*   (2006.01)
*F24J 2/46*   (2006.01)

(52) U.S. Cl.
CPC   *F24J 2/055* (2013.01); *F24J 2/465* (2013.01); *F24J 2/4636* (2013.01); *F24J 2/51* (2013.01); *F24J 2002/4681* (2013.01); *Y02E 10/44* (2013.01)

(58) Field of Classification Search
CPC ........... F16L 5/14; F16L 39/005; F16L 51/02; F16L 51/035; F16L 2201/20; F24J 2/465; F24J 2/4636; F24J 2/055; F24J 2/51; F24J 2002/4681; Y10S 126/904; Y02E 10/45; Y02E 10/44
USPC ......... 126/653, 654, 706, 709, 634, 652, 676, 126/617; 60/641.13, 641.15; 96/121, 134; 206/477, 461, 465, 464, 468
IPC ................................ F24J 2/51, 2/05
See application file for complete search history.

(56) References Cited

U.S. PATENT DOCUMENTS 2,687,146 A * 8/1954 Ferguson ................ F16K 24/04
                                                                  236/61
2,779,609 A * 1/1957 Portney et al. .................. 285/45
(Continued)

FOREIGN PATENT DOCUMENTS

CN   1707199   12/2005
CN   101551170   10/2009
(Continued)

OTHER PUBLICATIONS

"CN-101551170 Machine Trans.pdf"; Machine translation for CN #101551170; Sep. 2, 2011.*
(Continued)

*Primary Examiner* — Gregory Huson
*Assistant Examiner* — Daniel E Namay
(74) *Attorney, Agent, or Firm* — Kilpatrick Townsend & Stockton LLP

(57) ABSTRACT

Insulating element for expansion compensation device and method for manufacture thereof, of the type used in solar energy collector absorber tubes, being formed by a single piece in the form of a ring and with a bellows-like end portion, which is filled with rock wool or other equivalent insulating material, so as to create a hot air chamber which minimizes heat losses.

4 Claims, 4 Drawing Sheets

(56) References Cited

U.S. PATENT DOCUMENTS

| | | | | |
|---|---|---|---|---|
| 3,051,515 | A * | 8/1962 | Graves | 285/228 |
| 3,916,871 | A * | 11/1975 | Estes et al. | 126/666 |
| 4,133,298 | A * | 1/1979 | Hayama | F24J 2/055 126/591 |
| 4,186,725 | A * | 2/1980 | Schwartz | 126/694 |
| 4,233,957 | A * | 11/1980 | Kenny | 126/652 |
| 4,291,680 | A * | 9/1981 | White | F24J 2/055 126/674 |
| 4,886,048 | A * | 12/1989 | Labaton et al. | 165/104.27 |
| 6,705,311 | B1 * | 3/2004 | Schwartzman et al. | 126/657 |
| 7,013,887 | B2 | 3/2006 | Kuckelkorn et al. | |
| 7,552,726 | B2 * | 6/2009 | Kuckelkorn et al. | 126/653 |
| 8,528,542 | B2 * | 9/2013 | Ustun | 126/652 |
| 8,607,780 | B2 * | 12/2013 | Martinez Sanz et al. | 126/651 |
| 8,783,246 | B2 * | 7/2014 | Lu et al. | 126/676 |
| 8,881,721 | B2 * | 11/2014 | Morber et al. | 126/652 |
| 9,032,625 | B2 * | 5/2015 | Martinez Sanz et al. | F24J 2/055 29/890.033 |
| 2004/0050381 | A1 * | 3/2004 | Kuckelkorn et al. | 126/690 |
| 2008/0245519 | A1 * | 10/2008 | Ustun | 165/181 |
| 2009/0200319 | A1 * | 8/2009 | Vinjamuri | 220/589 |
| 2010/0126499 | A1 * | 5/2010 | Lu | 126/651 |
| 2010/0313877 | A1 * | 12/2010 | Bellman et al. | 126/653 |
| 2012/0186576 | A1 * | 7/2012 | Kuckelkorn et al. | 126/653 |
| 2012/0211003 | A1 * | 8/2012 | Kuckelkorn | 126/653 |
| 2012/0247456 | A1 * | 10/2012 | Martinez Sanz et al. | 126/653 |
| 2012/0251336 | A1 * | 10/2012 | Martinez Sanz et al. | 417/48 |
| 2012/0299289 | A1 * | 11/2012 | Martinez Sanz et al. | 285/187 |
| 2013/0025587 | A1 * | 1/2013 | Lopez Ferrero | 126/684 |
| 2013/0263844 | A1 * | 10/2013 | Reid et al. | F24J 2/055 126/635 |

FOREIGN PATENT DOCUMENTS

| | | | |
|---|---|---|---|
| CN | 201344669 | | 11/2009 |
| DE | 1814626 | * | 9/1970 |
| DE | 10 2007 042387 | | 6/2010 |
| FR | 2318393 | | 2/1977 |
| JP | 58052933 | A * | 3/1983 |
| ME | 2009/027700 | | 3/2009 |
| WO | WO 03042609 | A1 * | 5/2003 ......... F24J 2/05 |

OTHER PUBLICATIONS

Sanitar-, Heizungs- und Kliimmatechnik, Sections 5 to 8. Published by Blidungsverlag (Helmut Zierrhut) ISBN 3-427-07487-0 (2004), 354 pp.

Singh, Harjinder "Fundamentals of Hydroforming", 2003, Society of Manufacturing Engineers, Dearborn, MI, 226 pp.

Supplementary European Search Report mailed on Jul. 17, 2014 for application EP 10845613.8.

Third Party Observations filed on Mar. 23, 2012 in Spanish application 200902158.

* cited by examiner

INSULATING ELEMENT FOR EXPANSION COMPENSATION DEVICE AND METHOD FOR THE MANUFACTURE THEREOF

TECHNICAL FIELD OF THE INVENTION

The present invention describes an insulating element that allows reducing thermal losses in the expansion compensation device of tube-shaped solar energy receivers.

BACKGROUND OF THE INVENTION

The general principle of solar thermal technology is based on the concept of the concentration of solar radiation to produce steam generally, which is then used in standard power plants.

One of the greatest challenges in the development of solar thermo power plants is to increase the capture of solar energy, which has a relatively low density. There are two types of solar concentrators: line-focus concentrators and point-focus concentrators. The line-focus concentration is easier to install, since it has fewer degrees of freedom, but it has a lower concentration factor and therefore it reaches lower temperatures than point-focus concentration technology.

That is why the aim is to continue progressing in the development of the receiver tubes used in line-focus concentrators, to increase the capture of solar energy and to reduce thermal losses, such that the overall performance of the concentration plant increases.

The present invention revolves around one of the elements that is a part of said receiver tubes, specifically it deals with an insulating element for an expansion compensation device, which is explained below.

In general, a receiver tube consists of two concentric tubes between which a vacuum is produced. The inner tube, or absorber tube, through which the fluid that is heated flows, is made of metal and the outer tube is made of glass, usually borosilicate.

The expansion compensation device is placed between both tubes, in such a way that it allows movement in the longitudinal direction of the tubes and ensures the vacuum, absorbing any strain that the existing differences between the metal and the glass expansion coefficients might create.

However, this element needs to be insulated at its extremity in order to avoid losses that can take place due to natural convection. This insulating element is the one being developed in this invention.

In the state of the art there are known several solutions for this element, but the element that provides best results is the one disclosed by SCHOTT in the U.S. Pat. No. 7,013,887. In said document the heat losses at the end portion of the absorber tube are reduced by means of a double vacuum insulation, resulting from the element connecting to the metal tube, which already provides an insulation and, a second insulation formed between the folding bellows of the expansion compensation device and the glass tube, given that the free space left is very narrow so there is no air exchange. Additionally, at the end of the absorber tube (metal tube) there is placed a protector tube (20) whose axial length matches the length of the bellows, so it can be placed in either the glass tube zone or the glass-to-metal transition zone, that the bellows or expansion compensation devices are not affected by the direct sun radiation.

Basically, the invention deals with an element that allows insulating this zone to decrease thermal losses in addition to avoiding any direct heating due to the incidence of the concentrated light from the mirrors upon the glass-to metal seals.

With this insulation system, it has been observed that when it comes to introducing improvements in the expansion compensation device to increase the solar collector performance, no element addresses the issue of thermal losses at the tubes extremities.

Because of all the foregoing, the object of the present invention is to provide an insulating element that decreases thermal losses at the extremities of the absorber tube to improve the system effectiveness.

That is why, unlike in the known state of the art, our protector element protects from thermal losses a part, which is not the part mentioned in the prior patent (it protects the cover and part of the metal absorber tube, according to proposal 1 or the cover and the vessel according to proposal 2) and to this end it uses a bellow system, which allows to absorb the relative movement between its component parts, something that would be unfeasible with the elements known up to now.

DESCRIPTION OF THE INVENTION

The invention consists of a piece which allows to insulate and to decrease thermal losses in the expansion compensation device, following the relative movements that may take place between the assembly formed by the glass tube, the Kovar ring or glass-to-metal transition element, the expansion compensator device, the vessel (end of the metal absorber tube), the cover and the absorber tube.

The piece consists of a bellow-shaped element manufactured by hydro conformation, which houses inside an insulating material like rock wool, which will copy the geometry of the expansion compensation device.

In this way an air chamber is generated which allows decreasing the losses at the extremities of the receiver tubes.

There are two ways of placing the insulating element of the invention: either completely enveloping the expansion compensation device, thus achieving a greater reduction of thermal losses, or stretching it to the middle portion of the vessel (end of the metal absorber tube), a solution that is adaptable to the currently available commercial supports.

The choice of a bellow-type geometry allows to have an element that follows the relative movements of the expansion compensation device without having to introduce any load that, even though it is not a problem given the low rigidity values of the expansion compensation device, it could become one if it didn't allow the relative movements between the glass tube and the metal absorber tube.

This system, unlike the known state of the art, drastically decreases the losses due to natural convection providing a complete insulation to the extremity of the absorber tube, in such a way that if this insulating element was employed in the currently existing tube developments, thermal losses would decrease by 0.02% per tube, and given that a solar plant of 50 MWe has approximately 90,000 tubes, the thermal losses reduction in the entire plant would be extremely high.

DESCRIPTION OF THE DRAWINGS

To complete the description that is being made herein and in order to facilitate a better comprehension of the invention, a set of drawings are attached hereto, where by way of illustration and by no way of limitation, the following has been represented.

PREFERRED EMBODIMENT OF THE INVENTION

To achieve a better comprehension of the invention, below is going to be described, with the help of the figures, the insulating element according to a preferred embodiment.

Figure 1:
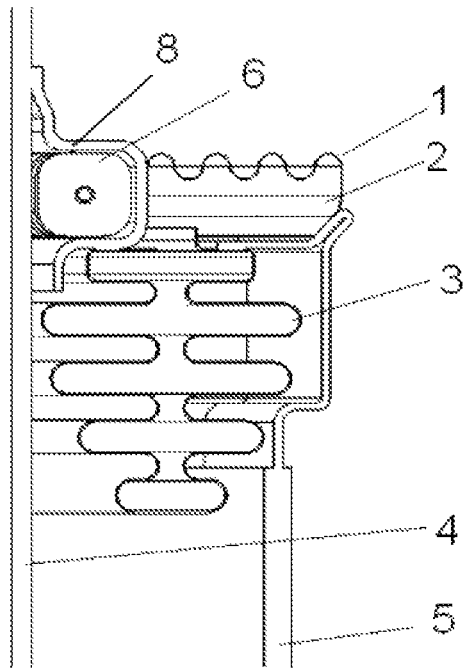
FIG. 1 shows an overview of the extremity of the receiver tube.
Figure 2:
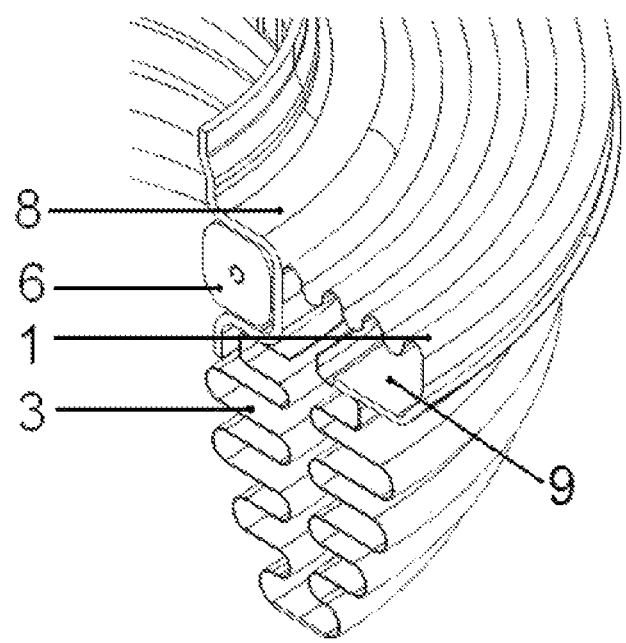
FIG. 2 shows an overview, according to proposal 2
Figure 3:
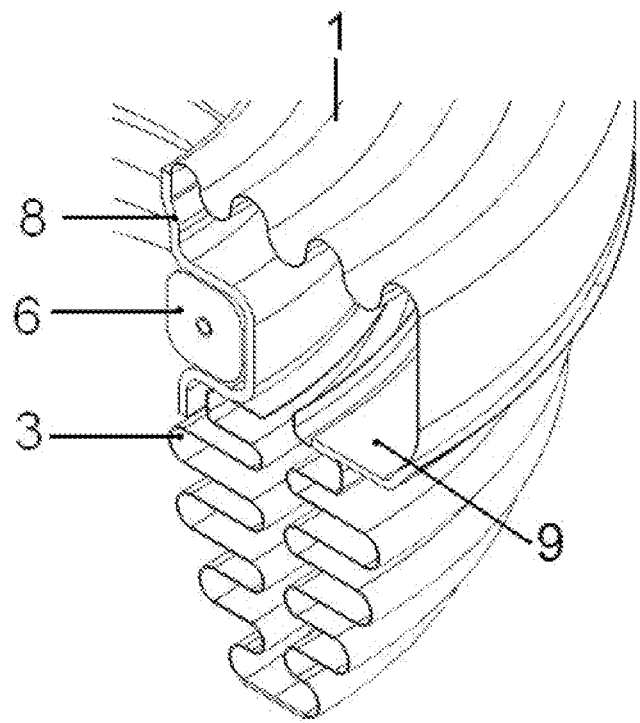
FIG. 3 shows an overview, according to proposal 1

In FIGS. 1, 2, and 3 are presented the overviews of the extremity of the receiver tube.

In FIG. 1, the assembly of the elements placed at the extremity of the receiver tube is shown and the location of the insulating element (1) between them.

The insulating element (1) is a closed ring (1) with interior filled with an insulating material (2) like rock wool or similar, with a toroidal geometry modified in such a way that when sectioned by a vertical plane, it offers, in its uppermost surface, a cross-section following a sinusoidal line, and it is placed in such a way as to be welded onto the cover (9), completely enveloping the upper extremity of the expansion compensation device (3) and is overlapped at its external portion by the glass tube (5). The rock wool filling (2) or similar serves to achieve the intended insulation since, thanks to this insulation, a hot air chamber is created, thus obtaining a thermal loss reduction.

This element (1) covers the extremity of the expansion compensation device (3) and its external portion is overlapped by the glass tube (5).

It can be arranged according to two possible proposals:

Proposal 1 (FIG. 3): the insulating element envelopes completely the upper portion of the expansion compensation device reaching to the upper part of the vessel (8), by vessel meaning the final end or extremity of the absorber tube (between them is the getter (6), but it lacks of any interest for the invention being disclosed herein)

Proposal 2 (FIGS. 1 and 2): the insulating element (1) reaches to the middle portion of the vessel (8).

The differences between the two proposals are based on the fact that proposal 1 achieves a greater thermal insulation than proposal 2; however the latter achieves a complete adaptation to the current commercially available supports.

Figure 4:
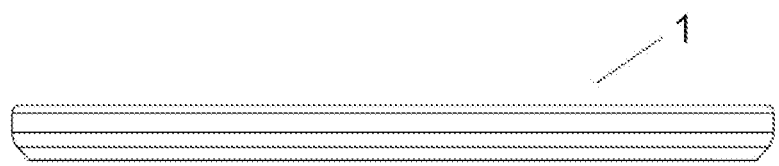
FIG. 4 shows an elevation view of the insulating element
Figure 5:
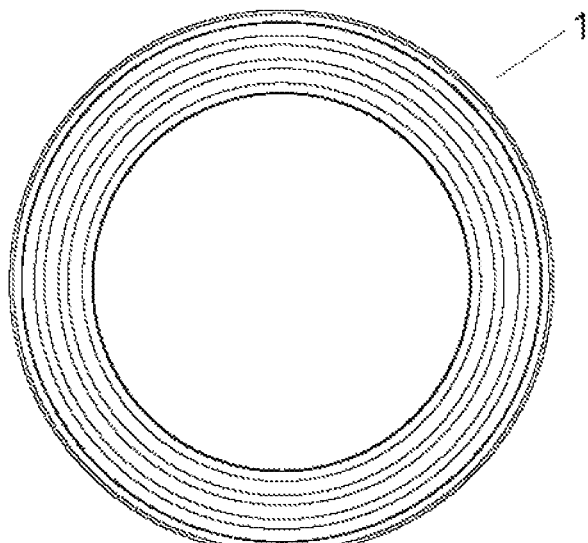
FIG. 5 shows a plan view of the insulating element

In FIGS. 4 and 5, an elevation and a plan view of the claimed insulating element (1) are exhibited. It can be observed that it is a bellow-type ring, wherein one of its bases has a shorter diameter than the other has, so it can be adapted to the site where is going to be placed, either according to proposal 1 or 2.

Figure 6:
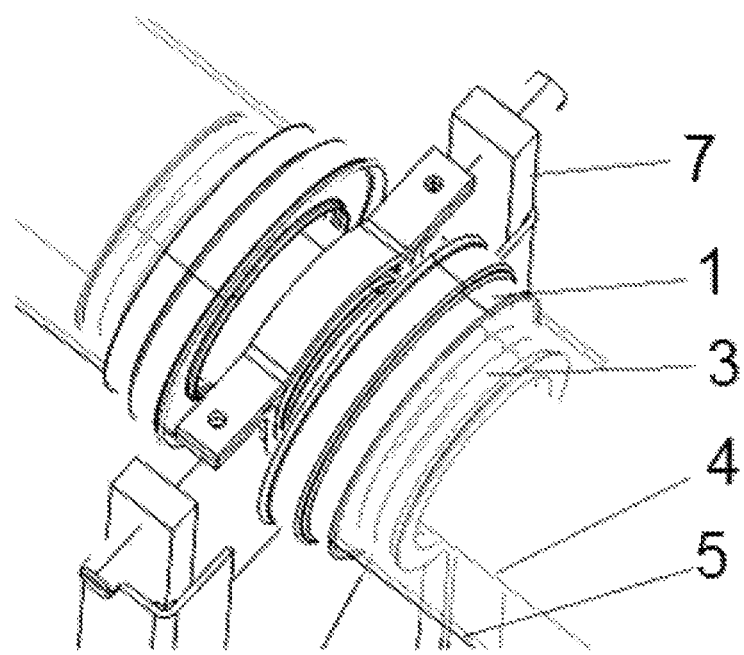
FIGS. 6, 7 show the extremity of the receiver tube over the assembly supporting elements
Figure 7:
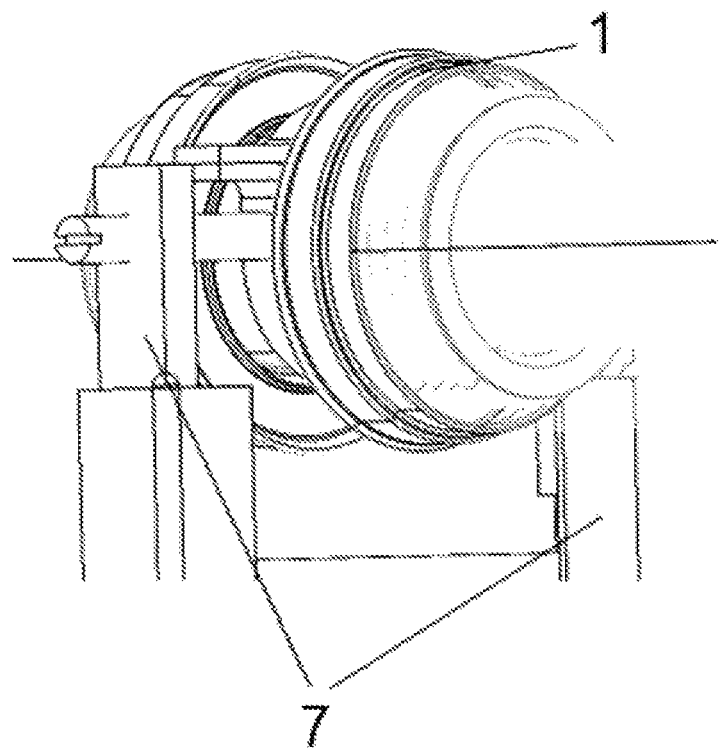

In FIGS. 6 and 7 are exhibited the end extremity of the receiver tube placed over the supporting elements (7). For receiver tubes of approximately 4 meters, these elements are placed at both extremities of the tube, although a pair of additional bearings are required along the tube to avoid any eventual breaking. As previously mentioned, proposal 2, that is to say, the embodiment wherein the insulating element (1) to until the middle portion of the vessel (8), although with a lower thermal insulation, achieves a complete adaptation to the current commercially available supports (7).

Figure 8:
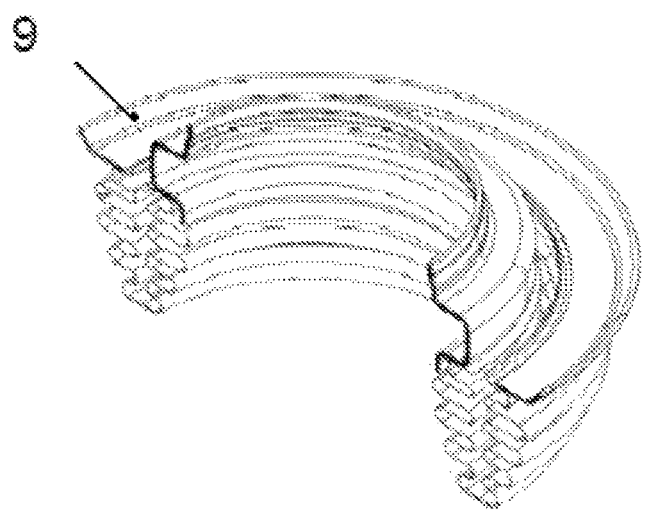
FIG. 8 shows a view of the cover Where the references represent:
1. Insulating element
2. Insulating material filling like rock wool or similar material
3. Expansion compensation device
4. Absorber tube
5. Glass tube
6. Getter
7. Supports
8. Vessel
9. Cover

In FIG. 8 there is shown a view of the receiver tube extremity where also the cover (9) can be seen.

The piece can be manufactured separately and independently from the cover (9), so it can be adapted to already existing tubes or it could be manufactured in a specific way, adapted to the expansion compensation device (3) in which is going to be installed.

The manufacturing process consists in manufacturing the piece by means of a hydro conformation technique. Basically, it involves a process to conform a material (generally a metal) through the action of a fluid under high pressure. The most common application consists in the conformation of a steel tube, which is introduced in a matrix (bellow-shaped tube) and a fluid under high pressure is projected against the walls of the tube, in such a way that the steel tube adopts a bellow shape; next, the now conformed tube (1), is welded by microplasma onto the cover (9). This system is specially designed to be applied in the absorber tubes of solar collectors, but it cannot be disregarded its extension to other fields of the industry requiring similar characteristics.

The invention claimed is:

1. An insulating element for an expansion compensation device of solar power receiver tubes of those that are formed by two concentric tubes between which a vacuum is produced, said concentric tubes being an absorber tube through which fluid that is heated flows and an outer glass tube, said absorber tube having an upper tube extremity, said expansion compensation device having an upper extremity and a cover at the upper extremity, said insulating element comprising a closed ring whose interior is filled with an insulating material like rock wool or similar to create an air chamber within the insulation and the expansion compensation device, with a toroidal geometry modified in such a way that when sectioned by a vertical plane it offers, in its uppermost surface, a cross-section following a sinusoidal line and is placed in such a way as to be welded to the expansion compensation device cover, said ring completely enveloping the upper extremity of the expansion compensation device.

2. The insulating element according to claim 1 wherein said element is located over the expansion compensation device at the absorber tube extremity, an inner diameter of said toroidal element reaching to the upper portion of a vessel, which is a final end attachment at the extremity of the absorber tube.

3. The insulating element according to claim 1 wherein said element is located over the expansion compensation device at the absorber tube extremity, an inner diameter of said toroidal element reaching to the middle portion of a vessel, which is a final end attachment at the extremity of the absorber tube.

4. A manufacturing method for the insulating element of claim 1, wherein said method uses a hydro conformation technique, starting with a steel tube, which is introduced in a matrix formed as a bellow-shaped tube and a fluid under high pressure is projected against a wall of the tube, such that the steel tube adopts a bellow shape; and next, the now conformed tube, is welded by micro-plasma onto the cover.

* * * * *